United States Patent [19]

Hiraki

[11] Patent Number: 4,796,107
[45] Date of Patent: Jan. 3, 1989

[54] APPARATUS FOR RESERVING PROGRAMS AT VARIOUS RECORDING TAPE RUNNING SPEEDS

[75] Inventor: Hiroshi Hiraki, Tokyo, Japan

[73] Assignee: Sony Corporation, Tokyo, Japan

[21] Appl. No.: 904,934

[22] Filed: Sep. 8, 1986

[30] Foreign Application Priority Data

Sep. 19, 1985 [JP] Japan ............................ 60-142984[U]

[51] Int. Cl.⁴ .............................................. H04N 5/76
[52] U.S. Cl. ................................ 360/33.1; 358/194.1; 358/310; 358/335; 455/171
[58] Field of Search ............... 360/33.1; 358/335, 310, 358/194.1; 455/171

[56] References Cited

U.S. PATENT DOCUMENTS 4,539,711  9/1985  Harger ...................... 358/194.1 X
4,623,887  11/1986  Welles, II ................. 358/194.1 X
4,718,112  1/1988  Shinoda ...................... 455/171 X Primary Examiner—Aristotelis M. Psitos
Attorney, Agent, or Firm—Ronald P. Kananen

[57] ABSTRACT

In a VTR for recording a plurality of TV programs at times previously set by a timer, a key for selecting any one of plural recording characteristics (e.g. tape running speed) is provided, and each of plural desired TV programs is recorded between determined recording start and end times on the basis of each of recording characteristics selected by the key. Therefore, for instance, a music program can be recorded at a slow tape speed in stable condition for allowing long-term preservation or a sports program can be recorded at a high tape speed in a single tape cassette while the user is out.

9 Claims, 3 Drawing Sheets

MEMORY MAP

APPARATUS FOR RESERVING PROGRAMS AT VARIOUS RECORDING TAPE RUNNING SPEEDS

BACKGROUND OF THE INVENTION

1. Field of the Invention

The present invention relates to a video tape recorder (VTR) provided with a TV program recording function controlled by a timer, and more specifically to a recording information signal reservation apparatus incorporated with the VTR for providing improved convenience in recording plural TV programs. Still more particularly, this invention relates to a timer-controlled recording technique wherein tape speed can be optimally selected according to program content.

2. Description of the Prior Art

In general, household video tape recorders (VTR's) are provided with a timer. When the timer is set, a broadcasting program of any desired channel can be recorded at any desired time. The above function is referred to as a timer program-recording function. Further, there exist many VTR's which can record a plurality of TV programs in a predetermined sequence. The VTR of this type is very convenient when some TV programs are to be recorded while the user is not at home In such household VTR's, the VTR set is designed so that an appropriate tape running speed can also be selected from among a plurality of tape speeds in the TV program recording operation. For instance, in the case of a β-format VTR, there are three kinds of program recording modes: β-I, β-II and β-III. The tape running speed is 4 cm/sec in the β-I mode, 2 cm/sec in the β-II mode, and about 1.33 cm/sec in the β-III mode. Furthermore, in this case, the width of the video track changes in proportion to the selected tape running speed.

Therefore, it is effective to select an appropriate tape running speed according to the kind of TV programs when recording plural TV programs in sequence. For instance, where a music program is recorded in the β-I mode, although the time period during which a single tape cassette can record is shortened, it is possible to record the video and audio signals in a stable condition to permit good-quality pictures and long-term preservation. On the other hand, where a long-time sports program such as a baseball game is recorded in the β-III mode, it is possible to record the entire sports program on a single tape cassette. Therefore, the β-III mode is convenient when a lengthy program is to be recorded while the user is not at home.

In the prior-art VTR's, however, a slide switch is provided for selecting only a single tape running speed. In the case where a plurality of TV programs are recorded in sequence on the basis of a timer, there exists a problem in that all TV programs must be recorded at the same tape running speed. Therefore, it is impossible to select an appropriate tape running speed according to the kind of TV programs. Moreover, it is not possible to record consecutive programs at different tape speeds.

SUMMARY OF THE INVENTION

It is, therefore, a primary object of the present invention to provide a recording information signal reservation apparatus for a VTR by which an appropriate recording characteristic, such as tape running speed, can also be selected for each TV program, in addition to the setting of a day of the week, a recording starting time, a recording ending time, a broadcasting channel, and so forth whenever plural TV programs are recorded under the control of a timer.

To achieve the above-mentioned object, the recording information signal reservation apparatus of a VTR for recording a plurality of TV programs at desired times, according to the present invention, comprises (a) recording characteristic selecting means for selecting any one of a plurality of recording characteristics; (b) recording time determining means for selecting a desired time during which a TV program is recorded; (c) channel selecting means for selecting any one of a plurality of broadcasting stations, (d) memory means for storing each selected recording characteristic, time and broadcasting station in a predetermined order according to a TV program; and (e) means for reading each stored recording characteristic, time and broadcasting station in order according to the TV program, to record the TV program of the selected broadcasting station during the determined time on the basis of selected recording characteristic in sequence.

The above recording characteristic is tape running speed, for instance. Therefore, in a VTR provided with the recording information signal reservation apparatus according to the present invention, it is possible to record each of a plurality of desired TV programs between predetermined recording starting and ending times on the basis of each of appropriately selected recording characteristics. For instance, a music program can be recorded at a relatively low tape speed in a stable condition for allowing long-term preservation and a sports program can be recorded at a relatively high tape speed on a single tape cassette even while the user is out.

BRIEF DESCRIPTION OF THE DRAWINGS

The features and advantages of the recording information signal reservation apparatus according to the present invention will be more clearly appreciated from the following description of the preferred embodiment of the invention taken in conjunction with the accompanying drawings in which.

DETAILED DESCRIPTION OF THE PREFERRED EMBODIMENTS

With reference to the attached drawings, the recording information signal reservation apparatus for a VTR according to the present invention will be described in further detail hereinbelow.

Figure 1:
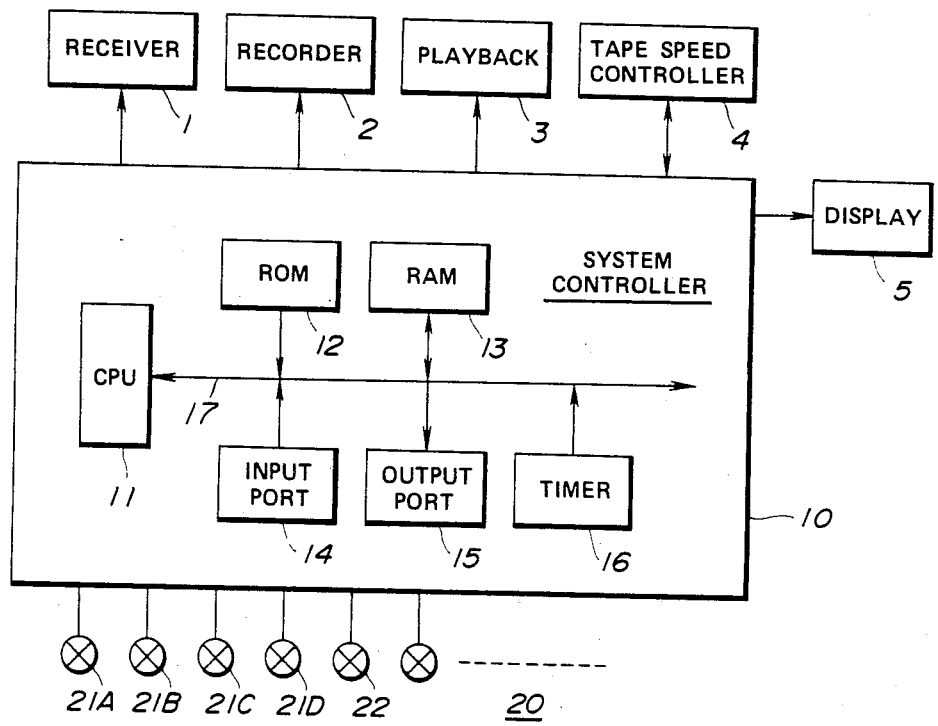
FIG. 1 is a schematic block diagram of the recording information signal reservation apparatus according to the present invention.

In FIG. 1, a receiving circuit 1 includes all of the necessary circuits for receiving a program having video and audio components including, for example, a tuner, a video detector, and an audio detector. A recording circuit 2 is provided for recording color video signals and audio signals. A playback circuit 3 is provided for reproducing the recorded color video signals and recorded sound signals. A tape running speed controller circuit 4 is included for controlling the running speed of a tape (not shown). Furthermore, in this embodiment, each of the circuits 1 to 4 is controlled by a system controller 10 which will be described later. A TV broadcasting station can be selected when a control voltage is supplied from the system controller 10 to the tuner of the receiving circuit 1. Further, as usual, the circuits 2, 3 and 4 are so operated as to record or playback TV programs in a $\beta$-format mode. However, according to the invention, an appropriate operation mode and/or an appropriate tape running speed $\beta$-I to $\beta$-III may be selected under the control of the system controller 10.

The system controller 10 is composed of a microcomputer which includes a CPU 11, a ROM 12 in which various programs are written, a RAM 13 for a work area and a data area, plural input ports 14, plural output ports 15, and a timer 16 which includes a real time clock. The components 12 to 16 are connected to the CPU 11 through a bus line 17. In this embodiment, four TV programs A, B, C and D can be reserved per week whenever TV programs are required to be recorded under the control of the timer, when the timer includes a four-program recording function.

Figure 2:
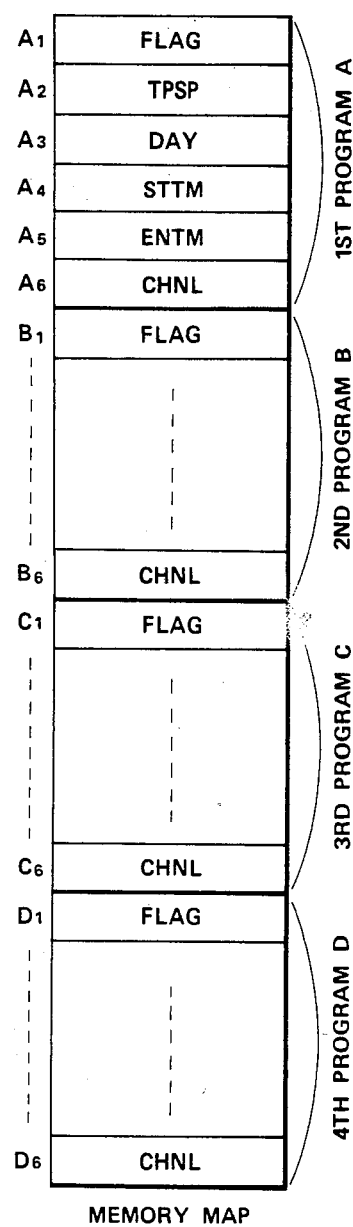
FIG. 2 is a diagram showing an example of memory maps for assistance in explaining the apparatus according to the present invention.

FIG. 2 shows an example of a memory map formed in the RAM 13. The memory map is roughly divided into four major areas, i.e. a first program area A, a second program area B, a third program area C, and a fourth program area D. Each of the major program areas A to D is respectively further divided into six minor areas A1 to A6, B1 to B6, C1 to C6, and D1 to D6, in order to record each of the recording information signals necessary for a controlled TV program recording operation. For instance, a flag representative of the first program A is stored at the area A1, data TPSP representative of a tape speed is stored at the area A2, data DAY representative of a day of the week is stored at the area A3., data STTM representative of a recording start time is stored at the area A4; data ENTM representative of a recording end time is stored at the area A5; and data CHNL representative of a broadcasting channel is stored at the area A6. Each minor area is a single address or a plurality of addresses in the RAM 13 according to the length of data to be stored as one of the recording information signals.

Referring again to FIG. 1, the reference numeral 5 denotes information signal displaying means of a fluorescent tube type, for instance, connected to the system controller 10 to indicate each of the reserved recording information signals such as tape running speed, day of the week, recording start and end times, and broadcasting channel. Various operation keys 20, i.e. non-lock normally-open push switches 21A, 21B, 21C, 21D . . . 22 serving as function reservation keys, are provided for selecting an appropriate operation mode and appropriate recording information signals, such as tape speed, day, start and end times, channel, and so forth. The keys 20 are dynamically-scanned via the input/output ports 14 and 15, and each key output is read by the CPU 11 to determine which keys are depressed.

Figure 3:
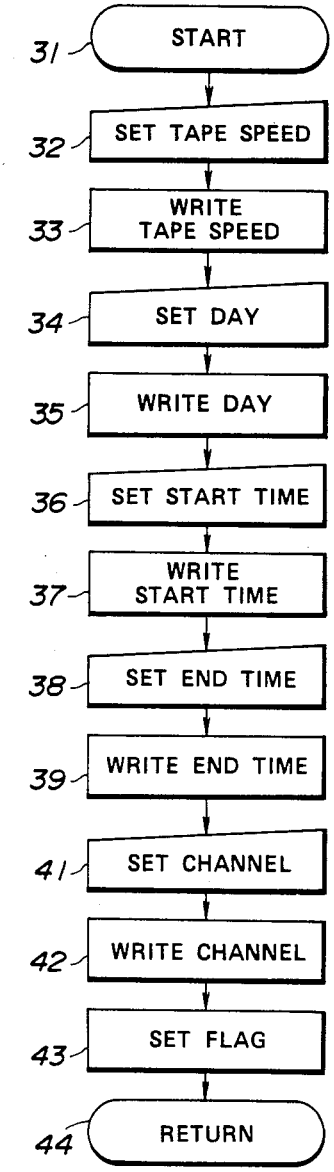
FIG. 3 is a flowchart showing the steps of storing a plurality of recording information signals such as a tape running speed, a day of the week, a recording start time, a recording end time, and a broadcasting channel, in sequence, for assistance in explaining the operation of a TV program reservation controlled by a timer.

The reservation of TV program recordings can be implemented in accordance with a reservation routine 30 as explained with reference to a flowchart shown in FIG. 3. The program routine 30 is stored in the ROM 12. When the first reservation key 21A of the keys 20 is depressed, for instance, the VTR adopts the reservation mode for the first timer program recording. The routine 30 starts from the step 31, and stands-by an input representative of a tape speed required in the first timer program recording operation in the succeeding step 32. If a tape speed key 22 of the keys 20 is depressed, data TPSP indicative of a tape speed is written in the area A2 of the first timer program recording areas A1 to A6 of the RAM 13 in the step 33. In the succeeding step 34, the routine stands-by an input representative of a day of the week for the first timer program recording. If a day key of the keys 20 is depressed, data DAY indicative of a day of recording is written in the area A3 of the first timer program recording areas A1 to A6 of the RAM 13 in the step 35. Thereafter, in the same way, the routine stands-by inputs successively representative of a recording start time, a recording end time, and a channel in the steps 36, 38, and 41, respectively. If inputted, data STTM indicative of the recording start time, data ENTM indicative of the recording end time, and data CHNL indicative of the channel are written, respectively, in an appropriate one of the first timer program recording areas A4, A5 and A6 of the RAM 13 in each of the steps 37, 39 and 42. Finally, a flag data FLAG indicative of the first TV program A is set at the area A1 in the step 43, and the routine 30 ends in the step 44.

In a case where second to fourth timer program recording operations are executed, the second to fourth reservation keys 21B to 21D are depressed and the necessary data are stored in the areas B2 to B6, C2 to C6, and D2 to D6, respectively. Each flag data FLAG is set in each area B1, C1 and D1 in accordance with the routine 30.

The reservation operation of the above-mentioned timer program recording is performed in a conversational manner by the use of the display means 5 or a TV screen when a TV set is turned on. Further, if a clear key among the keys 20 is depressed with the first reservation key 21A, for instance, and maintained in a depressed state, the flag data FLAG at the area A1 corresponding to the first timer program recording is reset to release the reservation of the first timer program recording A.

Figure 4:
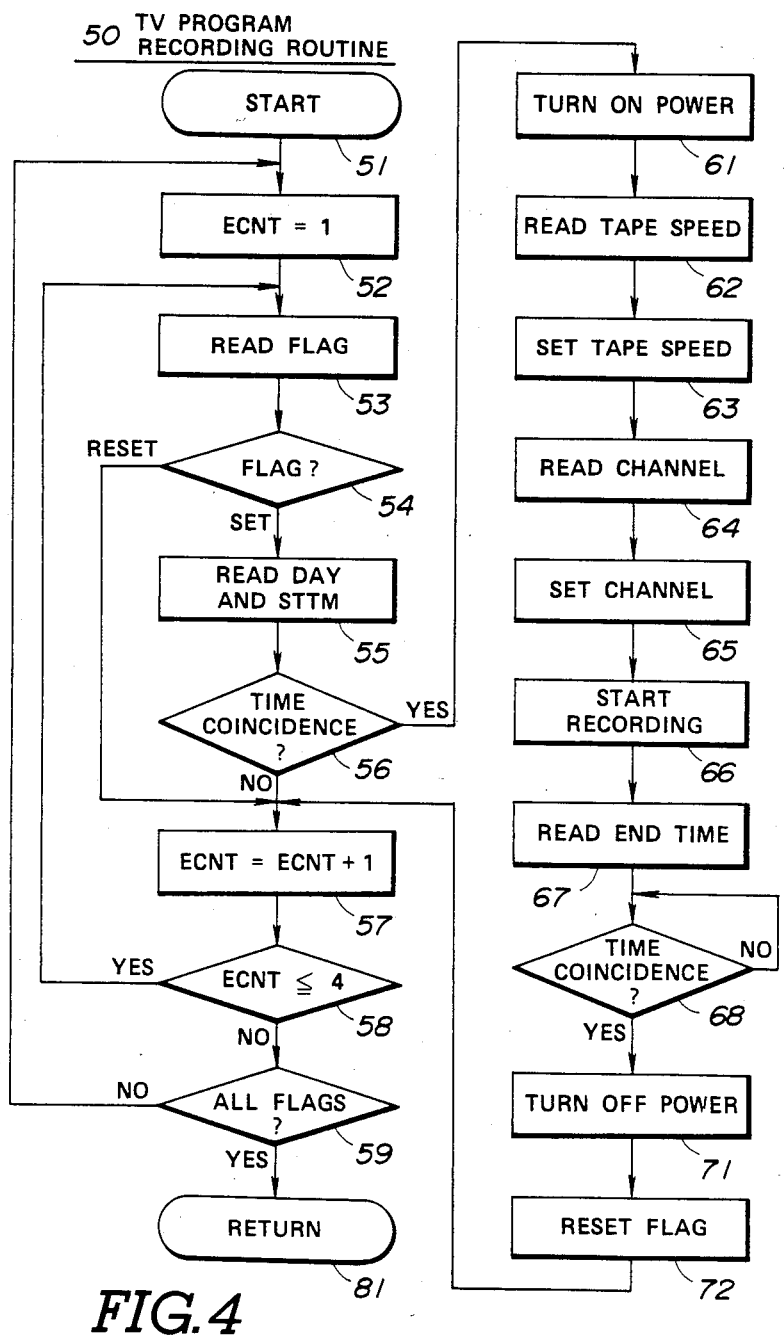
FIG. 4 is a flowchart showing the steps of recording a plurality of TV programs according to the information signal stored in accordance with the flowchart shown in FIG. 3, for assistance in explaining the operation of a TV program recording controlled by a timer.

After all the reservations of the timer program recordings have been completed, if the timer program recording key among the keys 20 is depressed, a routine 50 as shown in FIG. 4, for instance, starts to set the VTR to the timer program recording mode.

In more detail, when the timer program recording key is depressed, the routine 50 starts, beginning from the step 51, and a reservation counter or event counter ECNT is set to "1" in the succeeding step 52. The values of this counter ECNT are from "1" to "4" corresponding to the first to fourth timer program recordings A to D, respectively. In a succeeding step 53, the timer program recording corresponding to the value of the counter ECNT is selected. If ECNT is "1", the data areas A1 to A6 for the first timer program recording A are retrieved to read the flag data FLAG stored in the area A1. This read flag data FLAG is checked in the succeeding step 54.

When the flat data FLAG is set, that is, when the timer program recording has already been reserved, the processing proceeds from the step 54 to the step 55. In the step 55, since ECNT is "1" and the data areas A1 to A6 have been selected in this case, data DAY and STTM are read from the areas A3 and A4. In the succeeding step 56, data indicative of the present day and time are read from the timer 16, and compared with the data DAY and STTM read in the step 55. When both data do not match, that is, when the present day and time are different from the read day and time, the processing proceeds from the step 56 to the step 57. In the step 57, only the counter ECNT is incremented by "1". Next, in the step 58, the routine asks whether or not the counter ECNT exceeds the maximum value of "4". If ECNT is less than or equal to 4, the processing returns from the step 58 to the step 53.

In the step 54, when the flag data FLAG is reset, i.e. when no timer program recording operation is reserved, the processing proceeds from the step 54 to the step 57.

Therefore, each of the reservations of the first to fourth timer program recordings is checked serially in the steps 51 to 58. And, when a reservation has been made, it is determined whether or not the present time is the corresponding program recording start time.

Once the reservations of the first to fourth timer program recordings have been checked, ECNT=5 is eventually obtained when succeeding processing has been executed in the step 57. This value is discriminated in the step 58, and the processing proceeds from the step 58 to the step 59 to check whether all the flags are reset at the areas A1, B1, C1, and D1. If even one of them is not reset, the processing returns from the step 59 to the step 52.

Therefore, the steps 51 to 59 repeatedly check each reservation of the first and fourth timer program recordings. If a reservation is made, the processing checks whether the time reaches the recording start time.

If the data of the timer 16 matches the data DAY, STTM of the step 55 in the step 56, that is, if the time for timer-controlled program recording has come, the processing proceeds from the step 56 to the step 61. In the step 61, power is supplied to the receiver circuit 1, the recorder circuit 2 and the tape speed controller 4. In the succeeding step 62, if the data area of the RAM 13 is an area designated by the counter ECNT; that is, if ECNT=1, tape speed data TPSP is read from the area A2 of the areas A1 to A6, and these data TPSP are supplied to the tape speed controller 4 in the step 63 to set the controller 4 to a corresponding tape speed. The data TPSP are also supplied to the recording circuit 2 to set the recording characteristics of the recording circuit 2 to predetermined characteristics.

Subsequently, the processing of the CPU 11 proceeds to the step 64. At this step, since ECNT=1, the channel data CHNL is read from the area A6, and the data CHNL are supplied to the receiving circuit 1 in the step 65 to set the receiving circuit 1 to the channel corresponding thereto. In the succeeding step 66, a control signal indicative of the setting of program recording mode is supplied to the circuits 1 and 2, and the tape speed controller 4. Thus, the VTR is set to the program recording mode. That is, in this case, the previously designated channel starts to be timer-recorded at a predetermined tape running speed in accordance with the data recorded in the areas A1 to A6.

In the meantime, the processing of the CPU 1 proceeds to the step 67, and the data ENTM of recording end time is read from the area corresponding to the present timer program recording, that is, from the area A5 in this case. In the succeeding step 68, the data ENTM are compared with the present time data of the timer 16. If the data do not match, the processing returns to the step 68. If the data match, the processing proceeds to the step 71. Therefore, once the timer program recording starts, the step 68 is repeated until the recording end time.

At the program end time, since the data ENTM matches the present time data of the timer 16, the processing proceeds from the step 68 to the step 71. In this step 71, the power supply to the circuits 1 and 2, and the tape speed controller 4 is turned off to complete the program recording. In the succeeding step 72, the corresponding flag data FLAG, that is, the flag data FLAG at the area A1 (because ECNT=1) is reset, and then the processing proceeds to the step 57.

Therefore, in this case, the first timer program recording is performed in accordance with the steps 61 to 72. Thereafter, the stand-by situation for timer program recording can be obtained in the steps 51 to 59. However, in this case, since the flag data FLAG at the area A1 is reset as to the first timer program recording, when ECNT=1 (the first timer program recording), the processing proceeds from the step 54 to the step 57, without repeating the first timer program recording operation. After all the reserved timer program recordings have been completed, since all the flags FLAG are reset, the processing proceeds from the step 59 to the step 81 to release the timer program recording mode.

As described above, according to the present invention, it is possible to timer-record a plurality of TV programs. In this case, in particular, it is possible to record each TV program at an appropriate tape running speed.

Further, in the above description, the case of β-format VTR's has been described. However, it is possible to apply the present invention to 8-mm video type VTR's or audio open-type tape recorders, and the like. Further, the order of the steps from 32, through 34, 36, and 38, to 41 can be changed. Furthermore, if each flag data FLAG is set to its original states at the step next to the step 59, it is possible to record programs in the succeeding week. According to the present invention, each TV program can be recorded at an optimum tape speed for each timer program recording operation.

This invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. In an apparatus for recording signals at a predetermined future time, the combination of:
   first means for storing a plurality of first sets of data respectively representative of a plurality of said recording signals, each said first set of data including time, date and channel for reserving a recording at a predetermined future time of the signal represented by said first set of data;
   second means for storing second data representative of recording tape running speed respectively relatively related to each of the signals whose recording has been reserved; and third means for reading each of said first sets of data and said second data to cause each of said signals to be respectively recorded at said predetermined future times at the predetermined recording tape running speed related to the signal thus reserved.

2. The combination as set forth in claim 1, wherein said first storing means and said second storing means cooperate to store a tape running speed for each of said first sets of data respectively representative of said plurality of said recording signals.

3. The combination as set forth in claim 2, wherein the tape running speed stored in said second storing means for one of said first sets of data stored in said first storing means is different from the tape running speed stored for another of said first sets of data stored in said first storing means.

4. The combination as set forth in claim 1, wherein said first storing means and said second storing means are areas of a RAM in a microprocessor for controlling recording of said signals at said predetermined future time.

5. The combination as set forth in claim 1, wherein each of said first sets of data include data representative of the day, the starting time, and the ending time for recording said signals.

6. The combination as set forth in claim 5, further including means for manually entering a tape running speed in said second storing means for each of said first sets of data entered in said first storing means.

7. Apparatus for recording a plurality of broadcasting programs in accordance with previously set conditions comprising:
（a) means for selecting desired times during which the plurality of broadcasting programs are to be recorded;
(b) means for selecting from a plurality of broadcasting channels at least one broacasting channel on which said broadcasting programs are to be broadcast;
(c) means for selecting from a plurality of recording tape running speeds the running speed at which each said broadcasting program is to be recorded, wherein at least one said broadcasting program is to be recorded at a different recording tape running speed from other said broadcasting programs;
(d) memory means for storing the recording tape running speed, time and channel for each said broadcasting program; and
(e) means for reading each stored recording tape speed, time and channel to cause recording of each said broadcasting channel, and at the selected recording tape running speed in response to said memory means.

8. The apparatus according to claim 7, wherein the broadcasting programs are TV broadcasting programs.

9. The apparatus according to claim 7, wherein the broadcasting programs are radio broadcasting programs.

* * * * *